United States Patent [19]
Mittendorf

[11] 3,815,700
[45] June 11, 1974

[54] VEHICLE INSECT PROTECTION APPARATUS

[76] Inventor: Theodor H. Mittendorf, RR No. 1, Box 102, Tavares, Fla. 32778

[22] Filed: Nov. 13, 1972

[21] Appl. No.: 306,171

[52] U.S. Cl................................ 180/68 P, 296/91
[51] Int. Cl.......................... B60j 1/20, B60k 11/04
[58] Field of Search........... 296/91; 180/68 P, 69 R; 160/369, 368 S

[56] References Cited
UNITED STATES PATENTS

| | | | |
|---|---|---|---|
| 2,726,727 | 12/1955 | Abramson | 180/68 P |
| 2,778,439 | 1/1957 | Pfingsten | 296/91 X |
| 2,792,254 | 5/1957 | Hagglund | 296/91 |
| 2,868,308 | 1/1959 | Biewald | 180/68 P |
| 2,872,242 | 2/1959 | Whartman et al. | 296/91 |
| 3,015,517 | 1/1962 | Thornburgh | 296/91 |
| 3,336,969 | 8/1967 | Marchman | 160/368 S |

Primary Examiner—David Schonberg
Assistant Examiner—John A. Pekar
Attorney, Agent, or Firm—Duckworth, Hobby & Allen

[57] ABSTRACT

An insect protection apparatus for protecting moving vehicles from insects having a deflector shield for attachment to the front end of a vehicle for deflecting air currents and insects from the windshield of the vehicle and also including a screen attached to the deflector portion for covering an additional portion of the front end of the vehicle to catch insects to prevent the insects from hitting the front end of the car and getting into the vehicle radiator.

8 Claims, 4 Drawing Figures

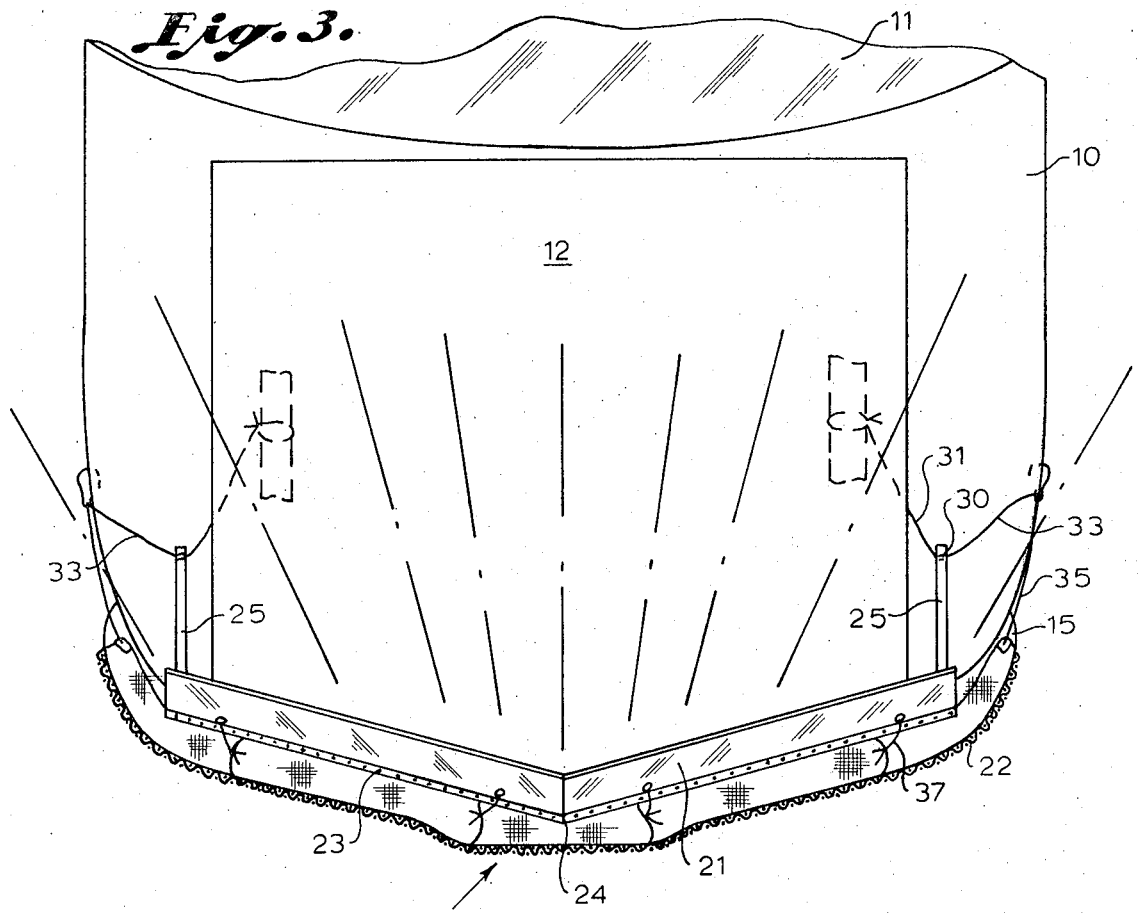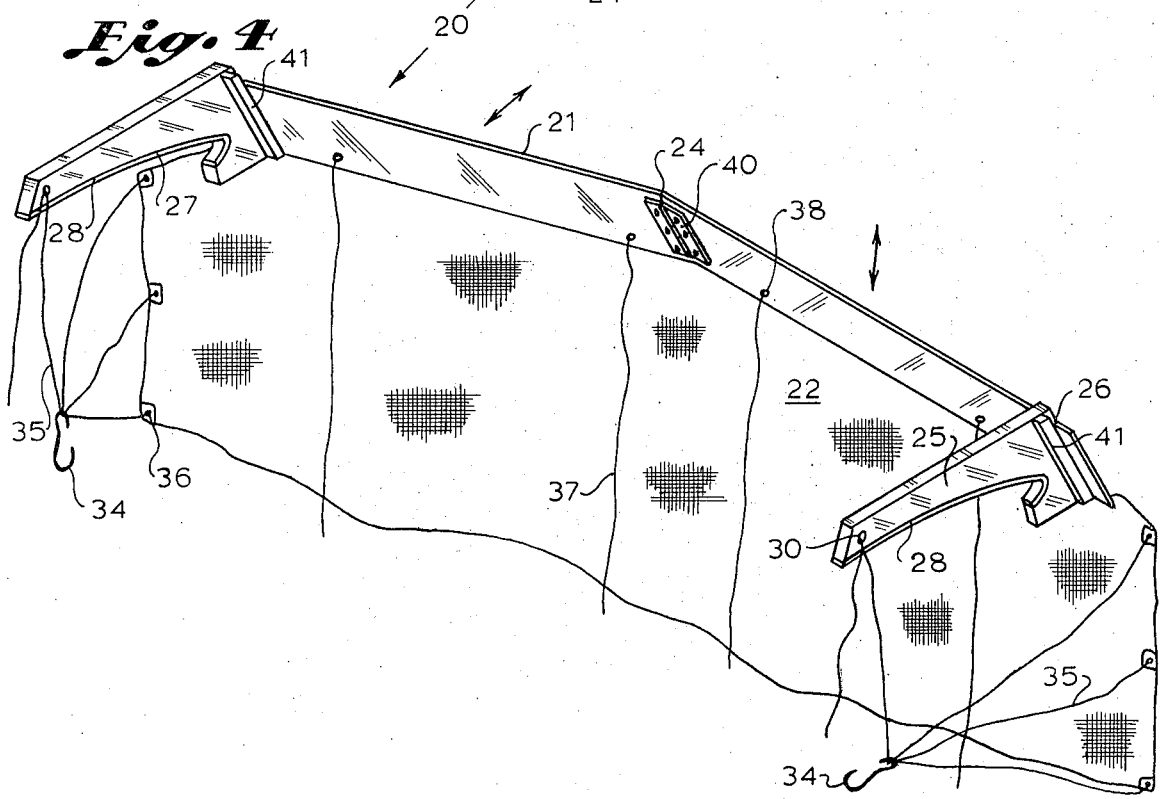

VEHICLE INSECT PROTECTION APPARATUS

BACKGROUND OF THE INVENTION

The present invention relates to a vehicle protection device for preventing insects and other materials from messing up the windshield and front end of a moving vehicle and from stopping up the radiator of the vehicle.

In the past it has been common to provide a great many deflectors for placement on different portions of a vehicle for controlling air currents and to prevent windshields from becoming messed up. Ons such deflector is placed on the top rear of a station wagon automobile to control air currents to prevent the rear windshield from becoming covered with dirt, and the like, from the eddy currents created by the vehicle. Other such devices provide deflectors placed on the hood or onside vent windows for either controlling air currents or deflecting insects to prevent the insects from splattering against the windshield or from getting into the automobile.

One prior U.S. Pat. No. 3,269,455, teaches a bug screen employing a metallic frame having spring loaded latching means for attaching to the front of a vehicle. Such screens are used for catching insects but similar screens on the front of vehicles are also used to prevent other trash from getting into the radiator as well as providing some trash protection for passengers in the vehicle.

In addition, the present invention provides for protection for the headlights which can lose some of their effectiveness by a large number of insects being splattered thereon and from hitting the windshield which reduces the visibility of the driver and passengers in the vehicle. This problem is especially acute in some southern states where twice a year lovebugs enter their breeding season in very large numbers of slow-moving mating bugs around the highways and can completely cover the front end and windshield of the vehicle. The bugs are very difficult to clean off of the windshield and front of the vehicle, and to remove from the vehicle's radiator.

One protection system that has been suggested wraps a piece of screen around the front end of the vehicle. This however, does not protect the windshield of the vehicle.

The present invention advantageously provides an air current deflection system for directing insects in the path of a moving vehicle out of the path of the vehicle windshield along with additional protection to prevent such insects from messing up the front end of the vehicle and clogging up the radiator.

SUMMARY OF THE INVENTION

An insect protection apparatus for moving vehicles is provided having a deflector shield with deflector surfaces for directing air currents and insects from the vehicle's windshield. The deflector shield is hinged to provide angled surfaces and is attached to a pair of support brackets which are shaped to engage the front end and hood of a vehicle for holding the shield in place. The support brackets and shield are attached to the vehicle with flexible cords and a screen is attached to the shield and extends over most of the front of the vehicle to cover the air intake for the engine compartment of the vehicle as well as to protect the lights, grills and bumpers from being messed up by insects splattered on a fast moving vehicle. The screen is attached to the vehicle and gives additional support to the deflector shield and part of the attachment means includes the cords attached to the hook for hooking onto the edge of the tire well. Attachments can also be made to the bumper from the shield and the brackets can be attached inside the hood for additional support. The apparatus is easily removable and reattachable to the front end of the automobile as desired.

BRIEF DESCRIPTION OF THE DRAWINGS

Other objects, features and advantages of this invention will be apparent from a study of the written description and the drawings in which

FIG. 3 is a top perspective view of the front end of the vehicle of FIGS. 1 and 2; and FIG. 4 is a perspective rear view of a preferred embodiment of the present invention, as seen in FIGS. 1, 2 and 3, separated from the automobile front end.

DESCRIPTION OF THE PREFERRED EMBODIMENT

The present invention relates to an insect protection apparatus for moving vehicles and especially the front end of automobiles, buses, trucks, and the like, to prevent insects from getting caught in the radiator and reducing the cooling capacity of the vehicle and from splattering on the front end of the vehicle where they are very hard to clean off.

Figure 1:
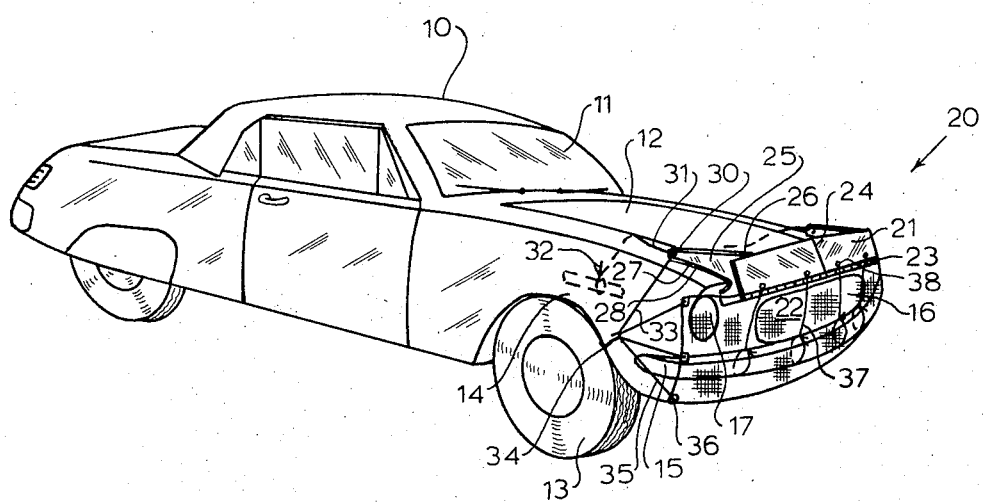
FIG. 1 is a perspective view of an automobile having the bug protector apparatus of the present invention attached thereto.
Figure 2:
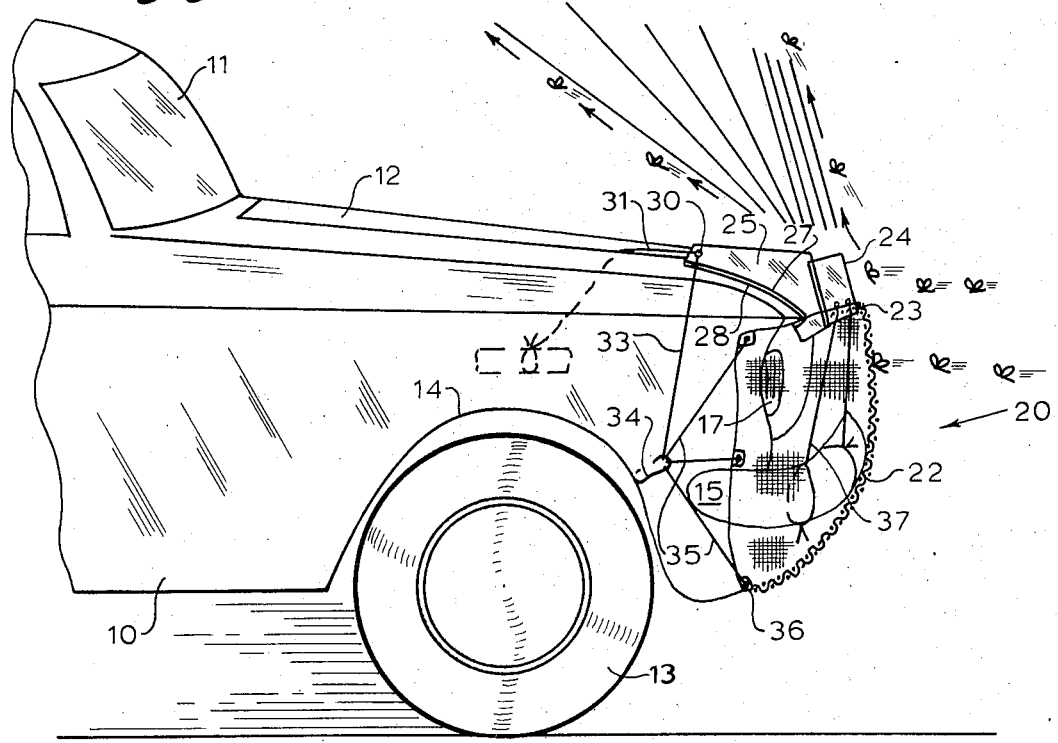
FIG. 2 is a perspective view of the automobile and insect protection apparatus of FIG. 1 as viewed from a different angle.

Referring to FIGS. 1–4, a vehcile 10 has a windshield 11 and a hood 12 along with front tires 13 and a tire well 14. A bumper 15 is connected to the front end and the grill for engine air intake is under the screen at 16 with lights 17 on either side thereof. The present apparatus 20 has an insect and air current deflecting shield 21 having a screen 22 attached thereto along the edge 23, which attachment may be by means of small tacks or brads or may utilize an attaching strip which may be screwed or otherwise attached to the shield to hold the screen thereto. The shield 21 has a jointed portion 24 which is hinged from the back so that it can be folded when off of the vehicle and can be curved to vary the angle between the shield surfaces to fit a particular automobile. It should be noted that the shield is tilted or angled toward the windshield as well as being angled to either side for directing air currents up and to each side of the windshield. This provides angles for deflecting the air currents and insects away from the windshield 11. The shield 21 has a pair of automobile attaching or supporting brackets 25 to which the shield 21 is attached by means of nails, screws, adhesive, or the like, and which may have a lip 26 overlapping the top of the shield 21 to provide additional support for the shield. The brackets 25 have an arcuate surface 27 which engages the hood and front curved portion of the vehicle for attaching the apparatus. The curved surface has a foam covering 28 to protect the vehicle from scars or scratches in the event the brackets 25 are made of metal or wood, or some material that might mar the painted surfaces of the vehicle. Bracket 25 also has an aperture 30 therein which a cord is attached to and fits under the hood of the vehicle and attached by tying a bow 32. This aperture 30 also provides an attachment point for a second cord 33 which is attached to a hook 34 which engages the tire well 14 of the frame of the vehicle. Hook 34 also is attached to a plurality of cords 35 which are attached to the screen 22 which has reenforcing grommets 36 for attaching the cords 35 at different points of the screen. These cords 36, as well as cord 33 can be made of resilient materials so that they would fit different size vehicles and can be stretched to pull the screen and deflector surfaces taut onto the frame of the vehicle. In addition a plurality of cords 37 attached to small apertures 38 in the shield 21 can be tied to the bumper 15 to provide additional front end support to the shield. This, in combination with the screen 22 wrapping around the bottom of the bumper 15 provides a firmly secure front end attachment system for the insect protection apparatus which may be rapidly connected and disconnected from the vehicle. This is especially important inasmuch as the seasons for insects, such as lovebugs, last for a short period and the remainder of the year the front end protecting system would not be needed.

In FIG. 4, the hinge 40 located behind the joint 24 provides a better view of the hingeing of the deflector shield 21 while providing an angled surface, which is adjustable for different cars. In this view it can be more clearly seen that a shield 21 is attached to the brackets 25 having support members 41 located on either side of the bracket and also having the lip 26 overhanging the edge of the deflectors 21.

It should be clear at this point that an insect protection system for moving automobiles has been provided but it should also be clear that the system provides protection against more than insects and would prevent scraps of paper and other trash from getting caught in the radiator of the vehicle and reducing its cooling capacitor.

The system may be made of any materials desired but the preferred screening is standard household window screen of a plastic, fiberglass or metal material, while the shields 21 can be made of polymer or plastic material, or can be easily made of various types of wood. The entire brackets and shield can also be molded of plastic as a single unit with screens molded directly thereto if desired. The cords can be any flexible cord material but the cords connecting the hook 34 to the apparatus would preferably by an elastic material to provide flexibility for different automobiles and to maintain the apparatus tautly onto the front of the vehicle, so that rubber bands or a similar material can be utilized. The hooks themselves would of course be made of a strong material such as steel which could of course be coated to protect the edge of the tire well from becoming scratched.

This invention is accordingly not to be construed as limited to the particular forms disclosed herein since these are to be regarded as illustrative rather than restrictive.

I claim:

1. An insect protection apparatus for moving vehicles comprising in combination:
   a. a deflector shield having deflector surfaces for directing air currents and insects away from a vehicle windshield;
   b. arcuate support brackets shaped to engage the front edge of a vehicle and being attached to said deflector shield for bracing said deflector shield on a vehicle;
   c. first attachment means for removably attaching said deflector shield and support brackets on a vehicle, said first attachment means having elastic flexible cords having hooks on one end for attaching said deflector shield support brackets to a tire well of a vehicle;
   d. a screen attached to said deflector shield for extending over the front end of a vehicle where said deflector shield is attached to, for preventing insects from passing therethrough onto the front end of said vehicle;
   e. second attachment means for removably attaching said screen to a vehicle, said second attachment means including elastic flexible cords attaching said screen to at least one hook on each side of said vehicle for hooking onto said vehicle tire well, whereby said insect protection apparatus is fixedly and removably securable to a vehicle and protects the windshield and front end of a vehicle from insects.

2. The apparatus in accordance with claim 1 in which said deflector shield includes two deflector surfaces hinged on one side thereof for adjusting the angle of deflection by bending the shields on said hinge for adjusting for different vehicles.

3. The apparatus in accordance with claim 2 in which said deflector shield is angled toward the windshield of a vehicle when attached thereto for directing air currents upward and outward to each side of the vehicle.

4. The apparatus in accordance with claim 1 in which said arcuate shaped surface of each said support bracket is lined with a resilient material to protect the painted surfaces of said vehicle.

5. The apparatus in accordance with claim 4 in which said first attachment means includes additional cords attached to said deflector shield adapted for tying to the bumper of a vehicle.

6. The apparatus in accordance with claim 5 in which said first attachment means includes additional cords connected to said support brackets at one end adapted to pass under the hood of a vehicle for tying to a portion of the engine compartment.

7. The apparatus in accordance with claim 6 in which said screen includes reinforcing grommets for attaching said cords to.

8. The apparatus in accordance with claim 7 in which said support brackets have a reinforcing lip extending over said deflector shield to provide additional strength to the deflector shield in the direction of a vehicle windshield attached to a vehicle.

* * * * *